United States Patent
Asahara et al.

[15] 3,669,930
[45] June 13, 1972

[54] THERMALLY STABLE THERMOSETTING RESIN

[72] Inventors: Tomohiko Asahara; Naoya Yoda, both of Kamakura-shi; Muneyoshi Minami, Otsu-shi, all of Japan

[73] Assignee: Toray Industries, Inc., Tokyo, Japan

[22] Filed: Nov. 5, 1969

[21] Appl. No.: 874,407

[30] Foreign Application Priority Data

Nov. 5, 1968 Japan...............43/80337
Dec. 13, 1968 Japan...............43/90910

[52] U.S. Cl. .............260/47 CZ, 117/161 P, 117/161 N, 260/30.6 R, 260/31.8 N, 260/41 R, 260/45.7 R, 260/45.75 R, 260/47 UA, 260/65, 260/78 UA, 260/78 SC, 260/851, 260/857 R

[51] Int. Cl............................................C08g 20/20
[58] Field of Search...........................260/78 UA

[56] References Cited

UNITED STATES PATENTS

| | | | |
|---|---|---|---|
| 2,818,405 | 12/1957 | Kovacie | 260/78 UA |
| 3,380,964 | 4/1968 | Grundschober et al. | 260/78 UA |
| 3,406,148 | 10/1968 | Sambeth et al. | 260/78 UA |

*Primary Examiner*—Harold D. Anderson
*Attorney*—Paul & Paul

[57] ABSTRACT

The present invention provides a thermosetting resin excellent in thermal stability, mechanical properties and electrical properties which is obtained by reacting dimaleimide with an amide in molten state.

1 Claim, No Drawings

THERMALLY STABLE THERMOSETTING RESIN

BACKGROUND OF THE INVENTION

1. Field of the Invention

The present invention relates to a process for the production of a thermally stable thermosetting resin having an imide ring and secondary or tertiary amino group in the main polymer chain.

2. Description of the Prior Art

Heretofore, it has been known, from French Pat. No. 1,455,514, that when N,N'-substituted dimaleimide is heated, a cured resin is obtained.

However, this compound generally has a high melting point and the velocity of free radical polymerization of the double bond of this compound, at a temperature higher than its melting point, is very fast. Therefore, difficulties are often encountered in trying to shape this cured resin. Strain tends to be retained in the resin product due to the rapid curing reaction. Furthermore because of its high cross-linking density, when the cured resin is subjected to a heat-shock test consisting of repeated heating and cooling, it tends to crack. Use of this resin has therefore been impractical.

On the other hand, epoxy resins have been known to be useful as non-solvent type insulated varnishes. However, they are difficult to use at a high temperature such as 180°–200° C because of certain of their properties, including specifically thermal stability.

OBJECTS OF THE INVENTION

It is an object of this invention therefore to provide a thermally stable thermosetting resin excellent in heat-shock resistance.

It is another object of this invention to provide a process for the production of a thermosetting resin excellent in thermal stability as well as other mechanical and electrical properties.

It is a further object of this invention to provide a non-solvent type varnish excellent in processability for impregnating coils of electrical machines such as motors and transformers.

Other objects of the present invention will become apparent from a further reading of the specification and the subjoined claims.

SUMMARY OF THE INVENTION

The objects of this invention have been achieved by providing a thermosetting resin excellent in various characteristics which resin is obtained by reacting a dimaleimide with at least one amine selected from the group consisting of primary monoamines and secondary polyamines. Secondary monoamines may also be included, however, either in combination with other amines from the foregoing group or with poly-primary amines.

DETAILED DESCRIPTION OF THE INVENTION

The prior art has found that when a dimaleimide is reacted with a polyamine having two or more primary amino groups, the resultant polymer exhibits improved characteristics as compared to the polymer which results from heating and reacting dimaleimide alone. The aforementioned problems and difficulties encountered in the prior art with the dimaleimide condensation are considerably decreased by this method. However, some difficulties in processing and impregnating with varnish produced by reacting a dimaleimide with a poly-primary amine still remain. In particular, the viscosity of the molten compound increases too fast and the potlife of the material is too short. It has now been found that these difficulties may be overcome by using, as the amine reactant, a primary monoamine or a polyamine having at least one secondary amino group. These reactants are preferably used in combination with di- or poly-primary amines. Alternatively, mono-secondary amines may be used in combination with di- or poly-primary amines. The resulting thermosetting resins are improved in processability and chemical and mechanical properties, especially in resistance to heat-shock, due to the moderately decreased polymerization velocity and lowered cross-link density as the amine reactant resulting from the use of amines with fewer active N-hydrogens.

The preferred dimaleimides for use in accordance with the present invention are represented by the following general formula

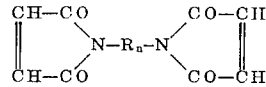

wherein $n$ may be 0 or 1 and R is a divalent organic group having at least one but below 20 carbon atoms. R may be an aliphatic, aromatic, alicyclic, heterocyclic radical or a group consisting of several of said radicals. Further, R may include non-carbon substituents such as halogens. The maleimide rings may be substituted by other groups also such as, for example, alkyl, aryl, alkoxyl, aryloxyl, alkylamino, arylamino, dialkylamino, hydroxyl, carbamoyl, cyano, halogen (fluorine, chlorine, bromine), etc. which do not interfere with the polymerization reaction.

Certain of the preferred dimaleimides are shown in the working examples. In addition, specific attention is directed to compounds such as N,N'-ethylenedimaleimide, N,N'-hexamethylenedimaleimide, N,N'-decamethylenedimaleimide, N,N'-dodecamethylenedimaleimide, N,N'-oxydipropylenedimaleimide, ethylenedioxy bis (N-propylmaleimide), N,N'-methaphenylenedimaleimide, N,N'-paraphenylenedimaleimide, N,N'-oxy (diparaphenylene) dimaleimide, N,N'-methylene (diparaphenylene) dimaleimide, N,N'-ethylene (diparaphenylene) dimaleimide, N,N'-sulfo (diparaphenylene) dimaleimide, N,N'-metaphenylene bis (paraoxyphenylene) dimaleimide, N,N'-methylene (di-1,4-cyclohexylene) dimaleimide, N,N'-isopropylidene (di-1,4-cyclohexylene) dimaleimide, 2,5-oxadiazolylenedimaleimide, N,N'-paraphenylene (dimethylene) dimaleimide, N,N'-2-methylparatoluylene dimaleimide, N,N'-hexamethylenedicitraconimide, N,N'-thio (diphenylene)-dicitraconimide, N,N'-methylene (diparaphenylene) bis (chloromaleimide) and N,N'-hexamethylene bis (cyanmethylmaleimide).

Some specific suitable amines for employment in this invention are polyamines having at least one secondary amino group that is polyamines of which at least one primary amino group is monosubstituted by an alkyl, aryl, alicyclic or heterocyclic radical. These radicals may of course also be substituted by various groups such as above-cited which produce no harmful effects on the polymerization reaction. In order that the polyamine have at least two reactive amino sites, it must, of course, have a total of at least two primary and secondary amino groups. Specific examples of such amines include N-monomethylparaphenylenediamine, N-monomethyl-4, 4'-diaminodiphenylether, N-monomethyl-4,4'-diaminodiphenylmethane, 3-N-monomethylaminobenz-4'-aminoanilide, 2-methylamino-4-aminotoluene, p-aminobenzyl-N-methylamine, 2-methylamino-5-aminoanisole, p-N-methylamino-o-ethoxyaniline, 3-methylaminopropylamine, 3-ethylaminoethoxypropylamine, 3-ethylaminoethylmercaptopropylamine, 6-methylaminohexylamine, N-monomethyl-4,4'-diaminodicyclohexyl methane, 2-N-phenylaminothylamine, -2-N-αpyridylaminoethylamine, 2-p-methylaminophenyl-5-amino-1,3,4-oxadiazole, 2-m-methylaminophenyl-5-aminobenzoxazole, N-mono-P-aminobenzylpiperazine, N,N'-dimethyl-4,4'-diaminodiphenylmethane, N,N'-diethyl-4,4'-diaminodiphenylether, N,N'-dimethyl-4,4'-diaminodiphenylpropane, N,N'-dimethyl-3,3'-diaminodiphenylsulfone, N,N'-dimethyl-m-phenylenediamine, N,N'-diphenyl-p-phenylenediamine, N,N'-dibetanaphthyl-P-phenylenediamine, N,N'-dimethyl-4,4'-diaminodicylcohexylmethane, N,N'-diethylhexamethylenediamine, N,N'-dimethyl-3,3'-diaminodipropoxyethane, N,N'-dimethyl-2,5-diamino-1,3,4-oxadiazole, piperazine, N-p-methyl aminophenylpiperazine, N,N'-alphapyridyl-3,3'-diaminopropylether, 4'-N- monomethylamino-3,5-diaminobenzanilide, 4'-amino-3,5-di-N-monolmethylaminobenzanilide, 4'-amino-2,4-di-N-monomethylaminodiphenylether, N-monomethyl-2,4,6-triaminopyridine, oligomer (dimer-pentamer, etc.) of acid catalyzed condensate of a mixture of aniline and monomethylaniline with formalin, N,N', N''-trimethyl-4,4'4''-triaminotriphenylamine, N,N',N''-triethyl-4,4'4''-triphenylphosphine, N,N',N''-trimethyl-3,5,4'-triaminobenzanilide, N,N'N'',NB:''-tetramethyl-3,3'-5,5'-tetraaminobenzophenone and oligomer (dimer, pentamer, etc.) of acid catalyzed condensate of monomethylamine with formalin. The preferred polyamine reactants are secondary N,N'diarylsubstituted-arlenediamines, such as N,N'-diphenylparaphenylenediamine.

Primary and secondary monomines are also suitable amines for employment in this invention. However, secondary monoamines are effective only when used together with primary and/or secondary polyamines. These monoamines may include the same kind of radicals and substituents as those of the abovesaid polyamine. Specific examples of monamines which may be used include methyl amine, ethyl amine, butyl amine, octyl amine, cyclohexyl amine, cyclohexylmethyl amine, aniline, O-chloroaniline, P-anisidine, α-naphthyl amine, benzyl amine, 2-phenylethyl amine, 2-amino pyridine, 3-aminofuran, amino pyrimidine, 5-amino benzoxazole, 5-aminobenzthiazole, ethanol amine, hexyl amine, octyl amine, nonyl amine, lauryl amine, stearyl amine, 3-butoxypropyl amine, 3-diethyl aminopropyl amine, o-toluidine, o-anisidine, o-amino phenol, p-aminodiphenylether, m-aminobenzophenone, m-aminobenzanilide, m-aminodiphenylsulfone, p-diphenylaminoaniline, dibutyl amine, diethanol amine, methyl ethyl amine, monomethylaniline, piperidine, morpholine, monomethylaminocyclohexane and monomethylaminonaphthalene, diphenyl and N-α- orβ-naphthylaniline. Combinations of these compounds may also be used. The preferred monoamines are those having long aliphatic chains, such as lauryl amine and butoxypropyl amine, those aromatic amines having a substituent at the o-position such as o-anisidine o-aminophenol and o-toluidine, etc., and secondary diarylamines such as, for example, diphenylamine.

Polyamine having at least two primary amino groups are desirably used together with the abovesaid polyamines having secondary amino groups and monoamines. These poly-primary amines also may include the same kind of radicals and substituents as described above with respect to the other amine reactants. Some of the poly-primary amines suitable for employment in this invention include methaphenylenediamine, paraphenylenediamine, 4,4'-diaminodiphenylpropane, 4,4'-diaminodiphenylethane, 4,4'-diaminodiphenylmethane, benzidine, 4,4'-diaminodiphenylsulfide, 4,4'-diaminodiphenylsulfone, 3,3'- diaminodiphenylsulfone, para-bis-(4-aminophenoxy) benzene, meta-bis-(4-aminophenoxy) benzene, 4,4'-diaminobiphenyl, 3,4'-diaminobenzanilide, 4-(para-aminophenoxy)-4'-aminobenzanilide, 3,4'-diaminodiphenyl-ether, 3,3'-dimethoxy benzidine, 2,4-bis(beta-amino-tertiary butyl) toluene, bis(para-beta-amino-tertiary butyl phenyl) ether, metaxylylenediamine, paraxylylenediamine, di(para-amino-cyclohexyl) methane, hexamethylene diamine, heptamethylenediamine, octamethylenediamine, nonamethylene diamine, 4,4-dimethyl-heptamethylenediamine, 3-methoxy-heptamethylenediamine, 2,11-diaminododecane, 1,4-diaminocyclohexane, 2,2'-diaminodiethylether, 2,2'-diaminodiethylthioether, 3,3'-diaminodi-propoxyethane, 2,6-diaminopyridine, guanamine, 2,5-diamino-1,3,4-oxadiazole, 2-(3'-aminophenyl)-5-aminobenzoxazole, 4,4',4''-triaminotriphenylamine, 2,4,4'-triaminodiphenylether, 3,4,4'-triaminodiphenylether, 3,5,4'-triaminobenzanilide, 4,4',4''-triaminotriphenylphosphine, 1,2,4-triaminobenzene, 1,2,4-triaminobutane, melamine, 3,3'-diaminobenzidine, 3,3',5,5'-tetraamino benzophenone, p-phenylenebis (2,4-aminophenyl) ether, 1,2,5,6-tetraaminohexane, dimethylenetrianiline trimethylenetetraaniline, and/or a polyamine polycondensation to a higher degree such as an acid catalyzed condensate of aniline and formalin.

Generally the process of the present invention is carried out by mixing a dimaleimide with an amine reactant, heating and causing the mixture to become a uniform molten liquid, then further heating and curing said liquid to a solid resin.

With 1 mol of dimaleimide, the total amine reactant may include a mono-amine equivalent (mols amine reactant × member of active amino groups per molecule) of 0.4 – 3.5 mol. A range of 0.7 – 2.8 mol amino equivalent is preferred however, and a range of 1 – 2.2 is most specifically preferred. Polyamines having at least one secondary amino group and monoamines, either primary or secondary, preferably comprise 5 – 80 percent in mol ratio, of the total amine reactant. Conversely, poly-primary amines preferably comprise from 20 to 95 percent of the total amine reactant. As regards the amine reactant in this reaction system, it is not necessary that all of the amine be completely consumed to build up the polymer chain, that is, even if some of the amine reactant remains in the produced polymer as monomer or oligomer according to its reactivity, a resin with excellent properties may still be formed.

The mixture in the process of the present invention is completely melted to a uniform molten state as fast as possible with vigorous stirring, because dimaleimide compounds generally have high melting points and at such high temperatures the polymerization reaction may proceed too rapidly, perhaps before one component is completely melted. Non-uniform gelation of the reaction mixture may also occur and it is conceivable that the physical properties of the cured resin thus produced may be defective. However, the reaction may be carried out with no particular restriction as to how or in what sequence each component is added to the mixture. Generally speaking, a variety of operations may be used to prepare a uniform molten system by heating and mixing as fast as possible. The temperature at which the melting operation is carried out may vary depending on the combination of monomers used. However, the operation is carried out normally at 40°–350° C, preferably at 100°–200° C. As for dimaleimide and amine compounds, one or more kinds of each may be used.

After a uniform molten mixture is obtained and the reaction proceeds somewhat, gelation occurs and it is possible to maintain the uniform molten state of the mixture, even below that required to melt it in the first place, without recrystallizing the higher melting point dimaleimide. The mixture at this stage may therefore be used at a lower temperature, lengthening its so-called pot life and facilitating its use in various impregnation and other operations. Further, it may be cooled to room temperature for processing at a later date.

The molten mixture thus produced is cured and solidified at 40° – 350° C, preferably 85° – 250° C, and especially preferably at 100° – 200° C. This curing reaction usually requires several hours. If necessary, it may be post cured for several more hours at 200° – 250° C.

This operation may be performed under atmospheric pressure or under negative or positive pressure and the cured resin product is not essentially affected by these conditions. In order to increase plasticity of the resin product, plasticizing additive may be used. Preferred additives for this purpose include triphenyl phosphate, tricresyl phosphate, trioctyl phosphate, dioctyl phthalate, dioctyl hexahydrophthalate, dilauryl succinate, a higher fatty acid amide and silicone grease. Inorganic and organic fillers, such as powder or short fibers of silica, mica, titanium oxide, calcium carbonate, diatomaceous earth, clay, talc, glass, asbestos, polypyromellitic imide, polybenzoxazole, polybenzimidazole and polyparaphenylene isophthalimide are preferable for the improvement of various physical properties of the resin product. These fillers are, of course, uniformly mixed and cured together with the resins. For improvement of thermal stability, additives comprising phosphorus compounds such as metaphosphoric acid, phosphorus acid and triphenyl phosphite and metal compounds such as compounds of arsenic, antimony and manganese may be used with remarkable effect.

A thermosetting high molecular weight polyimideamine resin obtained, as described above, by the addition reaction and heat curing of a dimaleimide compound (which addition reaction occurs at the double bond sites thereof) and an amine reactant exhibits excellent heat resistance. Even if heated at 250° C for 10 days, a weight loss of below 3 – 5 percent is shown and in thermogravimetrical analysis, at a temperature elevation rate of 6° C per minute, the temperature at which 10 percent of the weight of the polymer decomposes is more than 400° C. This polyimideamine also exhibits excellent electric characteristics such as insulation resistance and dielectric loss tangent at high temperatures. Furthermore, a remarkable advantage of the molten mixture, also at this stage referred to herein as a varnish, obtained as described above, is its excellent processability having an initial viscosity of less than 0.2 – 1 poise when a proper combination of reactants is selected and a period of more than 10 hours before the viscosity rises to 10 poises which is considered the viscosity limit to permit ready impregnation. This varnish shows especially excellent characteristics as an impregnating varnish for coils of a motor and as a casting varnish for impregnating and curing with glass fiber, being capable of making a non-solvent insulation varnish of a heat resistance of H-class having hitherto unobtainable good processability. Further, this varnish may be used for applying to pregreg impregnated and semi-cured glass fiber unidirectional warp tape, glass cloth tape, glass cloth prepreg, etc., which may be converted to shaped articles by heating and cured, if necessary, while being pressed. A broad scope of application is also possible as a casting varnish for making mechanical parts of various electric machines, bearing and friction materials, etc.

The following examples are given by way of illustration and are not intended to limit the scope of the subjoined claims.

EXAMPLE 1

13.8g (0.05 mol) of N,N'-hexamethylenemaleimide (HMI), 4.96g (0.025 mol) of methylenedianiline (MDA) and 4.64g (0.025 mol) of lauryl amine (LA) were mixed uniformly. The mixture was put inside a small flask and melted at 140°C and heated for about 15 minutes. Thereafter said molten material was poured into a flat bottom flask having a diameter of 20 mm containing a nut having a diameter of about 5 mm. The depth of the molten material in the can was about 20 mm. This material was heated at 150° C for 2 hours and at 170° C for 2 hours at which time the material was completely gelated. It was then cured at 180° C for 2 hours, at 200° C for overnight and finally at 250° C for 2 hours. This cured resin or varnish showed good properties. A heat shock test consisting of rapidly heating the material to 200° C for 10 minutes and then cooling it to 0° C for 10 minutes was performed 10 times. No cracks in the resin were produced. Also, said molten varnish was poured into a flat bottom aluminum can having a diameter of 55 mm to a depth of about 3 mm and cured similarly. The electric characteristics of this cured resin were excellent at high temperatures, especially as compared with the epoxy resins presently used in electrical fields. It had volume resistivities at 170° C of $9.2 \times 10^{11}$ ohm-cm and at 200° C of $2.3 \times 10^{10}$ ohm-cm and a dielectric loss tangent (at 1 KC and 170° C) of 0.03. This cured resin showed a volume shrinkage of below 2 percent and weight loss of about 3 percent upon curing. When it was heated at 200° C for 10 days, the weight decreased by only 3.7 percent showing excellent heat resistance. Further, this thermosetting varnish had a viscosity of about 0.4 poise at 100° C, which is relatively low, and a long pot life, over 15 hours, as evidenced by the time required for the viscosity to reach 10 poise. It therefore was an excellent casting varnish showing good processability in impregnation of coils for motors and transformers and of fibers for FRP.

EXAMPLE 2

13.8g (0.05 mol) of HMI, 4.96g (0.025 mol) of MDA, 3.72g (0.02 mol) of LA and 0.62g (0.005 mol) of O-anisidine (O-AN) were uniformly mixed and melted to heat cure the mixture as in Example 1. The viscosity st 100° C and the rate of viscosity increase of said varnish were about the same as those in Example 1 and the volume shrinkage and weight loss upon curing said varnish were also about the same as those in example 1. Further, this cured resin when tested for weight loss, by heating at 250° C for a long period, and resistance to heat shock, by exposing it to 10 cycles of successive 10-minute intervals at 200° C and 0° C, was shown to have properties similar to those observed in Example 1. Moreover, this product had good surface luster, a volume resistivity at 200° C of $1.2 \times 10^{11}$ ohm-cm and a dielectric loss tangent (at 1 KC) of 0.03.

EXAMPLE 3

In a mixture similar to that of Example 1, 2.68g (0.025 mol) of benzyl amine was used instead of LA. This mixture was stirred and heated as in Example 1. Complete gelation occurred after the material was heated at 150° C for 1 hour, at 160° C for 1 hour, and at 180° C for 1 hour. Curing was then accomplished by heating at 180° C for 1 hour, at 200° C overnight and finally at 250° C for 3 hours. The cured resin exhibited good heat shock resistance, when tested as in Example 1, and good heat resistance, showing a weight loss of 4.1 percent after heating at 250° C for 10 days.

EXAMPLE 4

A variety of mixtures of dimaleimides, polyamines and monoamines were stirred and heated as in Example 1. The cure cycle, and volume and weight loss upon curing for each are shown in Table I.

TABLE I

| No. | Dimaleimides (mol) | Polyamines (mol) | Monoamines (mol) | Curing conditions, ° C. (hr.) | Amount of heat decrease in volume (250° C., after 10 days) | Volume resistivity ohm-cm. (at 200° C.) |
|---|---|---|---|---|---|---|
| 4(a) | N,N'-ethylene-diamaleimide (0.05) | 4,4'-diamino diphenyl ether (0.025) | LA (0.025) | 150(2)+175(3)+250(3) | 3.4 | $7 \times 10^9$ |
| 4(b) | HMI (0.05) | 1,3-phenylene bis-4-amino-phenyl-ether (0.025). | O-AN (0.025) | 180(3)+200(16)+250(3) | 5.3 | $3 \times 10^{12}$ |
| 4(c) | HMI (0.05) | do | n-Butylamine (0.02) | 180(3)+200(16)+250(2) | 3.7 | $4 \times 10^{11}$ |
| 4(d) | N,N'-oxydi-P-phenylene dimaleimide (0.05). | 1,3-phenylene-bis-4-amino-phenyl-ether (0.03). | LA (0.01)+O-AN (0.01). | 180(3)+200(16)+250(2) | 3.6 | $2 \times 10^{10}$ |
| 4(e) | N,N'-methylenedi-P-phenylene dimaleimide (0.05). | MDA (0.035) | LA (0.015) | 150(2)+175(2)+200(16). | 4.2 | $1 \times 10^9$ |

TABLE I —Continued

| No. | Dimaleimides (mol) | Polyamines (mol) | Monoamines (mol) | Curing conditions, °C. (hr.) | Amount of heat decrease in volume (250° C., after 10 days) | Volume resistivity ohm-cm. (at 200° C.) |
|---|---|---|---|---|---|---|
| 4(f) | HMI (0.05) | 1,6-hexamethylenediamine (0.025) | LA (0.0125) O-AN (0.0125). | 130(2)+150(4) +170(3)+ 200(16) | 4.9 | |
| 4(g) | HMI (0.05) | 4,4'-diaminodicyclohexyl methane (0.025). | Octyl amine (0.025) | 130(2)+150(4) +170(3)+ 200(16) | 4.4 | |
| 4(h) | HMI (0.05) | Benzoguanamine (0.025) | do | 190(3)+210(2) +250(3) | 3.6 | |
| 4(i) | N,N'-methylenedi-4-cyclohexylenedimaleimide (0.05). | MDA (0.03) | LA (0.02) | 150(2)+175(3) +200(16) | 4.2 | |
| 4(j) | HMI (0.05) | MDA (0.025) | LA (0.01)+O-AN (0.01). | 150(3)+175(2) +200(16) +250(3) | 3.7 | 1×10¹⁰ |
| 4(k) | N,N'-hexamethylenediitraconimide (0.05). | MDA (0.03) | n-Butylamine (0.02). | 150(2)+175(4) +200(16) +250(3) | 3.3 | |
| 4(l) | HMI (0.05) | MDA (0.025) | Dibutylamine (0.025). | 150(2)+175(4) +200(16) +250(3) | 4.1 | |
| 4(m) | HMI (0.05) | MDA (0.025) | Monomethylaniline (0.025). | 150(2)+175(4) +200(16) +250(3) | 4.8 | |

EXAMPLE 5

Using various amines of the mol amount as shown in Table II, the reaction of these amines with 1 mol of N,N'-hexamethylenemaleimide was effected in a manner similar to that in Example 1. The molten varnish, in each case, was of moderate viscosity and increased slowly to 10 poise so that the processable time, i.e., the time during which the mixture remained sufficiently non-viscous to permit ready impregnation, was above 15 hours at 130° C. The obtained resin exhibited excellent endurance through 10 cycles of a heat shock test in which it was rapidly heated and cooled between 200° C and 0° C with a 5 mm diameter nut inserted in test piece of 20 mm diameter and 20 mm height. Other properties of these resins are listed in Table II.

teristics, the cured resin was found to have a flexural strength of 16.5 kg/mm², flexural modulus of 443 kg/mm² and a tensile strength of 11.3 kg/mm². When tested by preparing prepreg of glass cloth of resin content of 50 percent, sandwiching the prepreg between iron members and curing it under a pressure of 3 kg/cm² at 180° C for 2 hours and further at 200° C for 16 hours, the tensile shear strength of the resin, as an adhesive for the two iron members, was 168 kg/cm². This cured resin showed a volume shrinkage of below 2 percent and weight loss of about 3 percent upon curing and when heating at 250° C was continued, the weight loss after 10 days was only 3.1 percent, showing excellent heat resistance. Furthermore, as an impregnating varnish per se, this material had a viscosity at 100° C of about 0.4 poise, which is low, and a long pot life,

TABLE II

| No. | Monoamine (mol) | Diamine (mol) | Time until the viscosity of mixture attains 10 poise at 130° C. (hr.) | Curing condition °C. (hr.) | Weight loss after 10 days at 250° C. (5) | Dielectric loss tangent at 1 kc. and 200° C |
|---|---|---|---|---|---|---|
| 5(a) | Cyclohexylamine (0.35) Diphenylamine (0.6) | 4,4'-diaminodiphenylamine (0.35) | 18 | 180 (24) | 3.6 | 0.09 |
| 5(b) | Diphenylamine (0.4) | 4,4'-diaminodiphenylamine (0.7) | 15 | 200 (16) | 2.5 | 0.03 |

EXAMPLE 6

13.8g (0.05 mol) of N,N'-hexamethylenedimaleimide (HMI), 4.96g (0.025 mol) of methylenedianiline (MDA) and 5.85g (0.0225 mol) of N,N'-diphenyl-P-phenylenediamine (DPPA) were uniformly mixed, the mixture was put inside a small flask, melted at 140° C and heated for about 15 minutes. Thereafter, a molten varnish was poured into a flat bottom test tube having a diameter of 20 mm. A nut about 5 mm in diameter was also placed in the tube so that the depth of varnish was about 20 mm. Said varnish was then heated at 170° C for 4 hours. At the end of this time, the viscosity rose remarkably. Thereafter, it was cured at 200° C overnight, and finally aftercured at 250° C for 4 hours. The obtained cured resin showed good properties and no cracks were observed after it had been subjected to a heat shock test in which it was cycled through alternate 10 minute intervals at 200° C and 0° C with rapid heating and cooling between these temperatures. This molten varnish was also poured into a flat bottom aluminum can having a diameter of 55 mm so that the thickness was about 3 mm and similarly cured at 200° C overnight and then at 250° C for 4 hours. The volume resistivities of this material at 170° C was 7.8 × 10¹¹ ohm-cm and at 200° C was 3.5 × 10¹⁰ ohm-cm. The dielectric loss tangents (at 1 KC) were 0.03 at both 170° C and at 200° C. Further, this material had excellent properties at high temperature compared with the epoxy resins presently used in electric fields. With respect to mechanical characmaking an excellent varnish for impregnation of coils for motors and transformers and impregnation of fibers for FRP use (fiber reinforced plastics were used).

EXAMPLE 7

13.8g (0.05 mol) of HMI, 7.43g (0.0375 mol) of MDA, 1.30g (0.005 mol) of DPPA and 0.93g (0.005 mol) of lauryl amine (LA) were uniformly mixed, melted, heated and cured as in Example 6. The volume shrinkage and weight loss upon curing of this melted mixture were about the same as those in Example 6. Also, weight loss by heating at 250° C for a long period of time and heat shock resistance of the cured matter were about the same as those in Example 6 and further, it exhibited a volume resistivity at 200° C of 1.1 × 10¹⁰ ohm-cm and a dielectric loss tangent at 200° C (at 1 KC) of 0.04.

EXAMPLE 8

13.8g (0.05 mol) of HMI, 4.96g (0.025 mol) of MDA and 5.65g (0.025 mol) of N,N'-dimethylmethylenedianiline were uniformly mixed, melted, heated and cured, as in Example 6, to obtain a tenacious cured matter. The weight loss by heating at 250° C for 10 days of the cured matter was 4.5 percent and further, it exhibited a volume resistivity at 170° C of 9.3 × 10¹¹ ohm-cm and a dielectric loss tangent (at 1KC and 170° C) of 0.04.

EXAMPLE 9

Various dimaleimides and amines were uniformly mixed, melted, heated and cured as in the foregoing examples. The starting materials, the specific cure cycles and the physical and electrical properties of the product obtained in each case are listed in Table III.

EXAMPLE 10

13.8g (0.05 mol) of HMI, 2.48g (0.00125 mol) of methylene dianiline (MDA) and 8.96g (0.00375 mol) of LA were used in producing a varnish in a manner similar to that described in the foregoing examples. This varnish was heated and cured at 150° C for 2 hours and 170° C for 1 hour, followed by after-curing at 180° C for 2 hours, at 200° C overnight and finally at 250° C for 2 hours. The cured resin thus obtained was excellent in heat shock resistance with no cracks being produced by a heat shock test consisting of rapidly and repeatedly, through 10 cycles, heating the material to 200° C and cooling it to 0° C. Also, this cured matter was excellent in heat resistance, showing a volume decrease of only 4.6 percent after being continuously heated at 250° C for 10 days.

EXAMPLE 11

Various combinations of dimaleimides and amines were similarly uniformly mixed, melted, heated and cured. The

TABLE III

| No. | Dimaleimides (mol) | Primary amines (mol) | Secondary amines (mol) | Curing conditions, ° C. (hr.) | Volume decrease due to heating, percent (250° C., after 10 days) | Volume resistivity, cm. (at 200° C.) |
|---|---|---|---|---|---|---|
| 9(a) | N,N'-hexamethylene dimaleimide (0.05). | 1,3-phenylenebis-4-aminophenylether (0.035). | N,N'-dimethyl-4,4'-diaminodiphenylmethane (0.015). | 170(5) + 210(5) + 250(5) | 4.1 | 4×10¹ |
| 9(b) | do | do | N,N'-dimethyl-1,6-hexamethylenediamine (0.015). | 150(3) + 180(3) + 210(5) + 250(5) | 3.2 | 8×10¹⁰ |
| 9(c) | do | 1,3-phenylenebis-4-aminophenylether (0.03). | N,N'-dimethyl-4,4'-diamino dicyclohexylamine (0.02). | 150(3) + 180(3) + 210(5) + 250(3) | 3.5 | 5×10¹⁰ |
| 9(d) | do | 4,4'-diaminodicyclohexylmethane (0.025). | N,N'-diphenyl-P-phenylene diamine (0.025). | 130(3) + 180(3) + 230(8) | 2.9 | |
| 9(e) | do | Benzoguanamine (0.025) | do | 190(3) + 230(5) | 2.4 | |
| 9(f) | N,N'-methylenedi-P-phenylenedimaleimide (MMI) (0.05). | Methylenedianiline (0.03) | N,N'-diphenyl-P-phenylene diamine (0.04). | 180(3) + 200(16) + 250(5) | 3.1 | |
| 9(g) | N,N'-methylenedi-P-phenylenecitraconamide (0.05). | Methylenedianiline (0.025) | N,N'-diphenyl-P-phenylene diamine (0.02). | 180(3) + 200(18) + 250(4) | 3.7 | |
| 9(h) | N,N'-oxydi-P-phenylene dimaleimide (0.05). | Oxydi-P-phenylenediamine (0.025). | do | 190(3) + 220(16) + 250(4) | 2.4 | |
| 9(i) | MMI (0.05) | Methylenedianiline (0.03) | N,N'-diphenyl-P-phenylene diamine (0.01). N-P-aminobenzylpiperazine (0.01). | 180(3) + 200(16) + 250(5) | 3.5 | |
| 9(j) | HMI (0.05) | 1,3-phenylene-bis-(4-aminophenyl) ether (0.02). 3,4,4'-triamino-diphenylether (0.01). | N,N'-diphenyl-P-phenylenediamine (0.015). | 160(2) + 180(2) + 200(16) | 3.2 | |
| 9(k) | HMI (0.05) | 1,3-phenylene-bis-(4-aminophenyl) ether (0.02). 3,4,3',4'-tetra aminodiphenyl ether (0.01). | do | 160(2) + 180(2) + 200(16) | 3.5 | |

TABLE IV

| No. | Dimaleimides (mol) | Monoamines (mol) | Polyamines (mol) | Curing conditions, ° C. (hr.) | Percent volume decrease due to heating (250° C., 10 days) | Volume resistivity ohm-cm. (at 100° C.) |
|---|---|---|---|---|---|---|
| 11(a) | N,N'-hexamethylenedimaleimide (0.05). | Phenetidine (0.03) | N,N'-dimethylhexamethylene diamine (0.02). | 130(2)+170(2)+200(16)+250(3). | 3.6 | 8×10⁹ |
| 11(b) | do | Cyclohexylamine (0.03). | DPPA (0.02) | 130(2)+170(2)+200(16)+250(3). | 3.9 | |
| 11(c) | do | d-Aminopyridine (0.03). | DPPA (0.02) | 130(2)+170(2)+200(16)+250(3). | 3.8 | |
| 11(d) | N,N'-methylenedi-P-phenylene dimaleimide (MMI) (0.05). | Phenetidine (0.03) | DPPA (0.02) | 180(2)+200(16)+250(3). | 4.3 | |
| 11(e) | do | n-Butyl amine (0.03). | MDA (0.01) DPPA (0.01) | 130(2)+170(2)+200(16)+250(3). | 3.4 | 3×10¹¹ |
| 11(f) | N,N'-methylenedi-P-phenylene dicitraconimide (0.05). | Lauryl amine (0.03). | MDA (0.01) DPPA (0.01) | 180(2)+200(16)+250(3). | 4.1 | |
| 11(g) | HMI (0.05) | do | DPPA (0.01) P-aminobenzyl-4-amino cyclohexane (0.005). | 130(1)+180(2)+200(16)+250(3). | 4.7 | |
| 11(h) | N,N'-hexamethylenedimaleimide (0.05). | Lauryl amine (0.035). | N-P-aminobenzylpiperazine (0.015). | 180+(2)200(16)+200(16)+250(3). | 4.9 | |
| 11(i) | do | Phenetidine (0.03). | Benzoguanamine (0.01) DPPA (0.01). | 200(16)+250(3). | 4.1 | |
| 11(j) | do | Lauryl amine (0.03). | 4,4'-diaminodiphenylamine (0.015). | 175(2)+200(16). | 3.8 | |
| 11(k) | do | do | Diethylenetriamine (0.015) | 130(2)+170(2)+200(16). | 3.4 | |

The following is claimed:

1. A composition, heat curable to a thermoset resin, said composition consisting essentially of the reaction product obtained by contacting and reacting a uniform molten mixture of compounds (I), (II) and (III), I. A bis-maleimide selected from the group consisting of N,N'-hexamethylene dimaleimide, N,N'-methylene di-1,4-cyclohexylene dimaleimide, N,N'-ethylenedicitraconimide, N,N'-ethylenedimaleimide, N,N'-oxy-di-p-phenylene dimaleimide, N,N'-methylenedi-p-phenylenedimaleimide, N,N'-methylene di-p-phenylene-citraconimide and N,N'-oxy-di-p-phenylene dimaleimide, II. An organic polyamine selected from the group consisting of methylene dianiline, 4,4'-diamino-diphenyl ether, 1,3-phenylene-bis-4-amino-phenylether, 1,6-hexamethylenediamine, 4,4'-diamino-dicyclohexylmethane, benzoguanamine, 4,4'-diamino-diphenyl-amine, oxy-di-p-phenylene-diamine, p-aminobenzyl-4-amino cyclohexane, N-p-aminobenzylpiperazine, diethylenetriamine and 3,4,4'-triamino-diphenyl-ether, III. an additional amine reactant selected from the group consisting of laurylamine, o-anisidine, benzylamine, n-butylamine, octylamine, dibutylamine, monomethylaniline, cyclohexylamine, diphenylamine, N,N'-diphenyl-p-phenylene diamine, N,N'-dimethyl methylene dianiline, N,N'-dimethyl methylene dianiline, N,N'-dimethyl-4,4'-diaminodiphenylmethane, N,N'-dimethyl-1,6-hexamethylene diamine, N,N-dimethyl-4,4'-diaminodicyclohexylamine, N,N'-diphenyl-p-phenylene diamine, phenetidine and α-aminopyridine, wherein said organic polyamine compounds II supplies 20–95 percent of the total number of primary and secondary amino groups included in said mixture.

* * * * *